(12) United States Patent
Han et al.

(10) Patent No.: US 9,817,716 B2
(45) Date of Patent: Nov. 14, 2017

(54) SYSTEMS AND METHODS FOR RETAINING NON-CONVERGED DATA SETS FOR ADDITIONAL PROCESSING

(71) Applicant: Avago Technologies General IP (Singapore) Pte. Ltd., Singapore (SG)

(72) Inventors: Yang Han, Sunnyvale, CA (US); Shaohua Yang, San Jose, CA (US); Xuebin Wu, San Jose, CA (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 110 days.

(21) Appl. No.: 14/800,742

(22) Filed: Jul. 16, 2015

(65) Prior Publication Data

US 2017/0017548 A1    Jan. 19, 2017

(51) Int. Cl.
*G06F 11/00* (2006.01)
*G06F 11/10* (2006.01)
*G06F 3/06* (2006.01)

(52) U.S. Cl.
CPC ......... *G06F 11/1076* (2013.01); *G06F 3/064* (2013.01); *G06F 3/0619* (2013.01); *G06F 3/0673* (2013.01)

(58) Field of Classification Search
None
See application file for complete search history.

(56) References Cited

U.S. PATENT DOCUMENTS

| 8,291,283 | B1* | 10/2012 | Rad ............... H03M 13/036 714/752 |
|---|---|---|---|
| 8,422,615 | B2 | 4/2013 | Den Besten |
| 8,442,173 | B2 | 5/2013 | Kenney |
| 8,484,535 | B2 | 7/2013 | Graef et al. |
| 8,514,507 | B2 | 8/2013 | Isono et al. |
| 8,559,580 | B2 | 10/2013 | Dai et al. |
| 8,571,158 | B2 | 10/2013 | Chen et al. |
| 8,605,847 | B2 | 12/2013 | Mobin et al. |
| 8,832,525 | B2 | 9/2014 | Yang |
| 8,861,580 | B2 | 10/2014 | Abel et al. |
| 8,902,964 | B2 | 12/2014 | Aguilar-Arreola et al. |
| 2005/0237086 | A1 | 10/2005 | Galloway et al. |

(Continued)

OTHER PUBLICATIONS

U.S. Appl. No. 14/611,949, filed Feb. 2, 2015, Han.

(Continued)

*Primary Examiner* — Daniel McMahon
(74) *Attorney, Agent, or Firm* — Sheridan Ross P.C.

(57) ABSTRACT

Embodiments are related to systems and methods for data processing, and more particularly to systems and methods for multiple codeword processing in a data processing system. An illustrative data processing system includes a processing circuit that processes unprocessed codewords, and provides failed codewords when the processing fails to converge. The system may further include an input buffer circuit that selectively stores a combination of at least one of the unprocessed codewords and at least one of the failed codewords. The input buffer circuit includes a first portion that maintains any of the unprocessed codewords and the failed codewords, and a second portion that maintains only the failed codewords.

23 Claims, 5 Drawing Sheets

(56) References Cited

U.S. PATENT DOCUMENTS

| | | | |
|---|---|---|---|
| 2008/0301517 A1* | 12/2008 | Zhong | H03M 13/1102 |
| | | | 714/752 |
| 2009/0019335 A1* | 1/2009 | Boyer | H03M 13/1105 |
| | | | 714/755 |
| 2011/0252286 A1* | 10/2011 | Li | H03M 13/1114 |
| | | | 714/755 |
| 2012/0290894 A1 | 11/2012 | Graef et al. | |
| 2013/0132804 A1* | 5/2013 | Frayer | G06F 11/1012 |
| | | | 714/780 |
| 2013/0139022 A1* | 5/2013 | Chen | H03M 13/1117 |
| | | | 714/752 |
| 2013/0305114 A1* | 11/2013 | Olcay | H03M 13/1108 |
| | | | 714/755 |
| 2014/0085114 A1 | 3/2014 | Cideciyan et al. | |
| 2014/0208182 A1 | 7/2014 | Sakai et al. | |
| 2014/0281767 A1* | 9/2014 | Alhussien | G11C 16/3404 |
| | | | 714/721 |
| 2014/0314138 A1 | 10/2014 | Zhong et al. | |
| 2014/0344647 A1 | 11/2014 | Chilappagari et al. | |

OTHER PUBLICATIONS

U.S. Appl. No. 14/740,371, filed Jun. 16, 2015, Mobin.
U.S. Appl. No. 14/748,168, filed Jun. 23, 2015, Mobin.
Yuan Design Techniques for Decision Feedback Equalization of Multi-Giga-Bit Per Second Serial Data Links: A State of the Art Review IET Circuits, Devices and Systems Jan. 2013.

* cited by examiner

SYSTEMS AND METHODS FOR RETAINING NON-CONVERGED DATA SETS FOR ADDITIONAL PROCESSING

FIELD OF THE INVENTION

Embodiments are related to systems and methods for data processing, and more particularly to systems and methods for multiple codeword processing in a data processing system.

BACKGROUND

Various storage access systems have been developed that include an ability to sense data previously stored on a storage medium. Such storage access systems generally include circuitry and/or software used to process a sensed signal from a storage medium, and to process the sensed data in an attempt to recover an originally written data set. In some cases, the data includes too many errors to be corrected and the data is thus not recoverable.

Hence, for at least the aforementioned reasons, there exists a need in the art for advanced systems and methods for data processing.

SUMMARY

Embodiments are related to systems and methods for data processing, and more particularly to systems and methods for multiple codeword processing in a data processing system.

Various embodiments provide data processing systems that include: a processing circuit and an input buffer circuit. The processing circuit is operable to process unprocessed codewords, and to provide failed codewords when the processing fails to converge. The input buffer circuit is configured to selectively store a combination of at least one of the unprocessed codewords and at least one of the failed codewords. The input buffer circuit includes: a first portion operable to maintain any of the unprocessed codewords and the failed codewords, and a second portion operable to maintain only the failed codewords.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
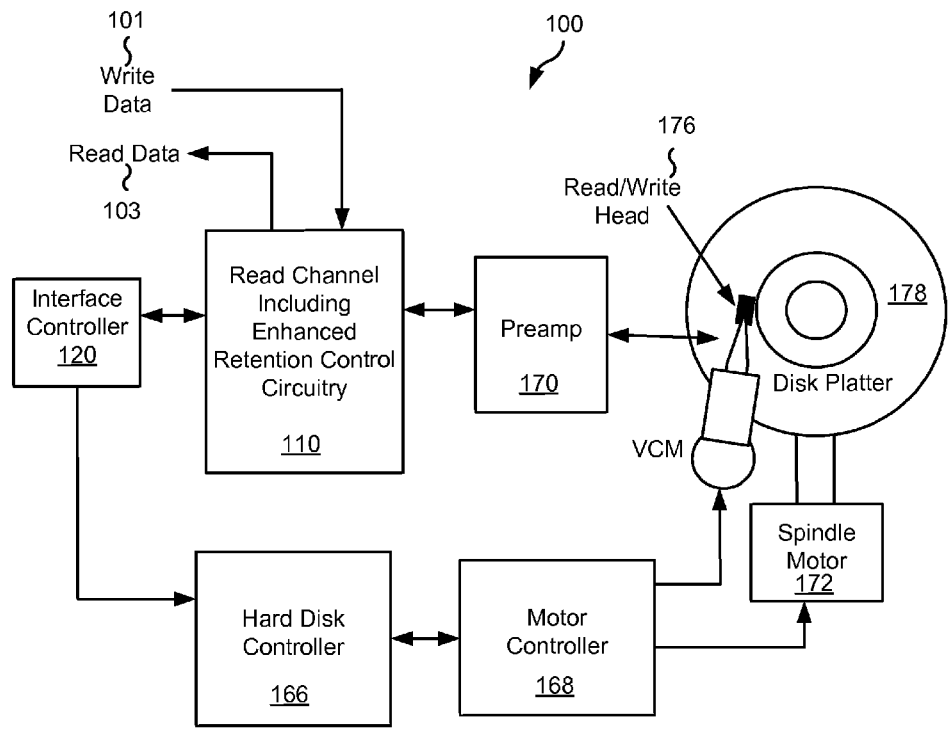
FIG. 1 shows a storage device including enhanced retention control circuitry in accordance with various embodiments of the present inventions.

Embodiments are related to systems and methods for data processing, and more particularly to systems and methods for multiple codeword processing in a data processing system.

In some systems a codeword is processed through an allowed number of iterations, but fails to converge. In such a case, the failed codeword may be retained in a sample buffer for additional processing thus increasing the possibility of convergence. Such is not possible, however, where the number of codewords to be retained exceeds the size of the sample buffer or a number of codewords allowed to be retained in the sample buffer is exceeded. To address this limitation, some embodiments include a sample buffer that is partitioned into two portions: (1) a first portion that holds both unprocessed and processing codewords along with up to N failed codewords (where N represents a whole number), and (2) a second portion that is dedicated to holding only failed codewords (up to M retained codewords, where M represents a whole number). In such embodiments where a codeword fails to converge after a prescribed number of iterations it is eligible for retention. If the first portion is not fully used, the failed codeword is retained in the first portion. Otherwise, if the first portion is fully used, the failed codeword is retained in the second portion where space is available in the second portion.

In some cases, the codewords include cross codeword error correction data as more fully discussed in U.S. patent application Ser. No. 14/611,949 entitled "Systems and Methods for Soft Data Based Cross Codeword Error Correction" and filed Feb. 2, 2015 by Han et al. The entirety of the aforementioned application is incorporated herein by reference for all purposes. The aforementioned discloses calculation of cross codeword soft data adjustment values in accordance with the following equations:

$$LLR_{CCECC,in} = LLR_{Det,ext} LLR_{Dec,ext};$$

$$\text{sign}\{LLR_{CCECC,ext}\} = \text{Accumulated CrossCodewordsSyndrome} + \text{xor}(\text{sign}\{LLR_{CCECC,in}[\text{All Other Failed Codewords}]\}); \text{ and}$$

$$|LLR_{CCECC,ext}| = \min(|LLR_{CCECC,in}[\text{All Other Failed Codewords}]|).$$

LLR is soft data also known in the art as log likelihood ratio data, and as such is a particular type of the more general soft data. $LLR_{CCECC,in}$ is the prior soft data for the cross codewords error correction decoding, $LLR_{CCECC,ext}$ is the extrinsic soft data for the cross codewords error correction decoding, $\text{xor}(\text{sign}\{LLR_{CCECC,in}[\text{All Other Failed Codewords}]\})$ is the XOR of the signs of $LLR_{CCECC,in}$ of all of the other failed codewords, and the AccumulatedCrossCodewordsSyndrome is the cross codeword error correction partial syndrome computed by XORing the bits in bit positions that are protected by the cross codewords error correction coding of converged user codewords and/or the converged cross codeword error correction codeword.

In some embodiments disclosed in this application, a direct calculation of the aforementioned cross codeword soft data adjustment values is not possible where all failed (i.e., non-converging codewords) are not retained. In contrast, an approximation of the aforementioned cross codeword soft data adjustment values is made, with the approximation being used in place of corresponding values that would have resulted had there been sufficient room in the sample buffer to retain all non-converged sectors. The approximation is calculated in accordance with the following equations:

$$LLR_{CCECC,in} = LLR_{Det,ext} + LLR_{Dec,ext};$$

$$\text{sign}\{LLR_{CCECC,ext}\} = \text{Accumulated CrossCodewordsSyndrome} + \text{xor}(\text{sign}\{LLR_{CCECC,in}[\text{All Other Retained Failed Codewords}]\} + \text{sign}\{LLR_{CCECC,in}[\text{All Other Non-Retained Failed Codewords}]\}); \text{ and}$$

$$|LLR_{CCECC,ext}| = \min(|LLR_{CCECC,in}[\text{All Other Retained Failed Codewords}]|).$$

In other embodiments, the approximation is calculated in accordance with the following equations:

$$LLR_{CCECC,in} = LLR_{Det,ext} + LLR_{Dec,ext};$$

$$\text{sign}\{LLR_{CCECC,ext}\} = AccumulatedCrossCode\ wordsSyndrome +$$
$$xor(\text{sign}\{LLR_{CCECC,in}[\text{All Other Retained Failed } Codewords]\} + \text{sign}$$
$$\{LLR_{CCECC,in}[\text{All Other Non-Retained Failed } Codewords]\}); \text{ and}$$

$$|LLR_{CCEC,ext}| =$$
$$\min\left\{\begin{array}{l}(|LLR_{CCECC,in}[\text{All Other Retained Failed } Codewords]|) \\ (|LLR_{CCECC,in}[\text{All Other Non-Retained Failed } Codewords]|)\end{array}\right\}.$$

Various embodiments provide data processing systems that include: a processing circuit and an input buffer circuit. The processing circuit is operable to process unprocessed codewords, and to provide failed codewords when the processing fails to converge. The input buffer circuit is configured to selectively store a combination of at least one of the unprocessed codewords and at least one of the failed codewords. The input buffer circuit includes: a first portion operable to maintain any of the unprocessed codewords and the failed codewords, and a second portion operable to maintain only the failed codewords. It should be noted that the first portion and the second portion may be physical partitions or virtual partitions. For example, where the input buffer has eleven slots each large enough to maintain a codeword, and initially the first portion has seven slots numbered from 1-7 in which at most two failed codewords may be maintained and the second portion has four slots numbered from 8-11 which are dedicated for retaining the failed codewords. Where noise or other factors cause difficulty in decoding and all slots 1-7 may become occupied (i.e., the first portion is full). Where a physical partition is used, where the first codeword fails, the codeword in, for example, slot 1 of the first portion would be transferred into a slot in the second portion, and the newly added codeword would be put into slot 1. In this way, the first portion always occupies slots 1-7 and the second portion always occupies slots 8-11. In contrast, where virtual partitions are used, slot 1 would be re-identified as part of the second portion, and one of the slots of the second portion would be re-identified as part of the first portion. This would allow the newly received codeword to be stored in the re-identified slot of the first portion and avoid the need to move data between slots like in the case of the physical partitions.

In some instances of the aforementioned embodiments, the processing circuit includes: a data detector circuit operable to apply a data detection algorithm to one of the unprocessed codewords from the first portion to yield a detected output; and a data decoder circuit operable to apply a data decoding algorithm to a decoder input derived from the detected output to yield a decoded output. In some cases, the detected output is a first detected output and the decoded output is a first decoded output. In some such cases, the data detector circuit is further operable to apply the data detection algorithm to one of the retained codewords from the first portion to yield a second detected output, and the data decoder circuit is operable to apply the data decoding algorithm to a decoder input derived from the second detected output to yield a second decoded output. In other such cases, the data detector circuit is further operable to apply the data detection algorithm to one of the retained codewords from the second portion to yield a second detected output, and wherein the data decoder circuit is operable to apply the data decoding algorithm to a decoder input derived from the second detected output to yield a second decoded output. In some particular cases, the data decoding algorithm is a low density parity check decoding algorithm, and the data detection algorithm is a maximum a posteriori data detection algorithm.

In one or more instances of the aforementioned embodiments, the input buffer circuit includes a sample buffer and a retention control circuit. In such instances, the retention control circuit is operable to determine whether respective ones of the retained codewords are to be stored in the sample buffer. In some cases, the retention control circuit causes a respective one of the failed codewords to be stored to the first portion when a maximum number of failed codewords is not already stored in the first portion. In one or more cases, the retention control circuit causes a respective one of the failed codewords to be stored to the second portion when either the maximum number of failed codewords is already stored in the first portion or the first portion is full. In a particular case where M is the size of the second portion and N is the maximum number of failed codewords for the first portion, M is greater than N. In other cases where M is the size of the second portion and N is the maximum number of failed codewords for the first portion, M is less than or equal to N. In various cases, the value of one or both of M or N are user programmable.

Other embodiments provide data processing systems that include a data processing circuit that is operable to receive a data set including a plurality of data codewords and a cross codewords error correction codeword including encoding generated from the plurality of data codewords. Failed processing of one of the plurality of data codewords yields a first failed codeword and failed processing of another of the plurality of data codewords yields a second failed codeword. The data processing circuit includes: and wherein the data processing circuit includes: a scheduling circuit, a cross codeword processing circuit, and a data decoding circuit. The scheduling circuit is operable to selectively retain the first failed codeword as a retained codeword and selectively discard the second failed codeword as a non-retained codeword. The cross codeword processing circuit is operable to calculate a soft data adjustment value based at least in part on both the retained codeword and the non-retained codeword. The data decoding circuit is operable to apply a data decoding algorithm to at least one of the user data codewords guided by a decoder input generated in part from the soft data adjustment value.

In some instances of the aforementioned embodiments, the soft data adjustment value is a first soft data adjustment value, and the data processing circuit further includes: a data detector circuit operable to apply a data detection algorithm to at least one of the plurality of data codewords guided by a detector input generated in part from a second soft data adjustment value. In some such instances, the data detector circuit provides a detector output, and the decoder input is generated in part by adding the first soft data adjustment value to the detector output. In various instances of the aforementioned embodiments, the decoder input is generated by multiplying the result of adding the first soft data adjustment value to the detector output by a scaling value. In one or more instances of the aforementioned embodiments, the data decoding circuit provides a decoder output, and the detector input is generated in part by adding the second soft data adjustment value to the decoder output. In some such instances, the detector input is generated by multiplying the result of adding the second soft data adjustment value to the decoder output by a scaling value.

Yet other embodiments provide methods for processing data, the methods include: accessing an unprocessed codeword from a first portion of a sample buffer; applying a processing algorithm to the unprocessed codeword to yield a failed codeword where the processing algorithm failed to converge; and using a retention control circuit to determine a location to retain the failed codeword. The retention location of the failed codeword is a second portion of the sample buffer where the first portion of the sample buffer is full or a maximum number of failed codewords is already stored in the first portion, and is the first portion of the sample buffer where the first portion of the sample buffer is not full and a maximum number of failed codewords is not already stored in the first portion.

Turning to FIG. 1, a storage system 100 including a read channel circuit 110 having enhanced retention control circuitry in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

Data written to disk platter 178 includes a cross codewords error correction encoding that is used to correct non-converging codewords using other converging codewords. In operation, a user data set is encoded using standard encoding techniques, and additionally is encoded to add another codeword based upon the codewords including user data and acting as a check on the other codewords. As an example, such cross codewords encoding may be done in accordance with that discussed in U.S. patent application Ser. No. 14/611,949 that was previously incorporated herein by reference for all purposes. Where the decoding of any of the user data codewords fails to converge, soft data generated based upon other failed codewords and the additional codeword are used to correct errors in the non-converging codewords.

During the decoding process, the aforementioned enhanced retention control circuitry operates to determine whether a failed codeword is: (1) retained in a first portion of a sample buffer where both previously unprocessed codewords and failed codewords may be maintained, (2) retained in a second portion of a sample buffer where only failed codewords may be maintained, or (3) is discarded due to limitations on the sample buffer. Where one or more failed codewords are not maintained in the sample buffer, information about those failed codewords is stored by the enhanced retention control circuitry for use in relation to cross codewords error correction processing. Where one or more failed codewords cannot be retained, the cross codewords error correction processing provides approximated soft data adjustment values based in part on the information maintained regarding the non-retained codewords. In some cases, the data processing including enhanced retention control and approximated cross codewords error correction is performed using a circuit similar to that discussed below in relation to FIGS. 2a-2b. The processing may be done consistent with a method discussed below in relation to FIGS. 3a-3c.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2B:
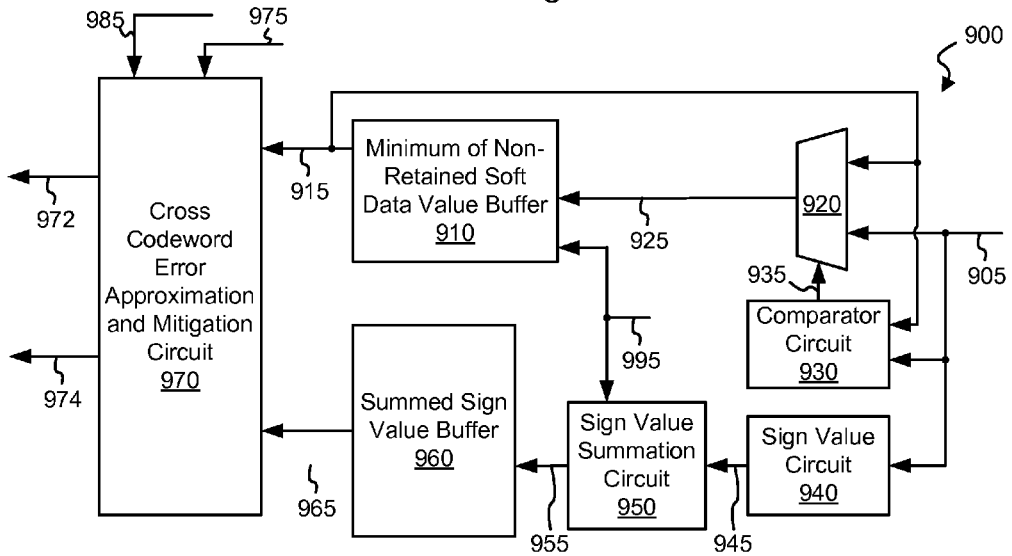
FIGS. 2a-2b depict a data processing circuit including an input buffer circuit having a retention control circuit and a sample buffer in accordance with some embodiments of the present inventions.
Figure 2A:
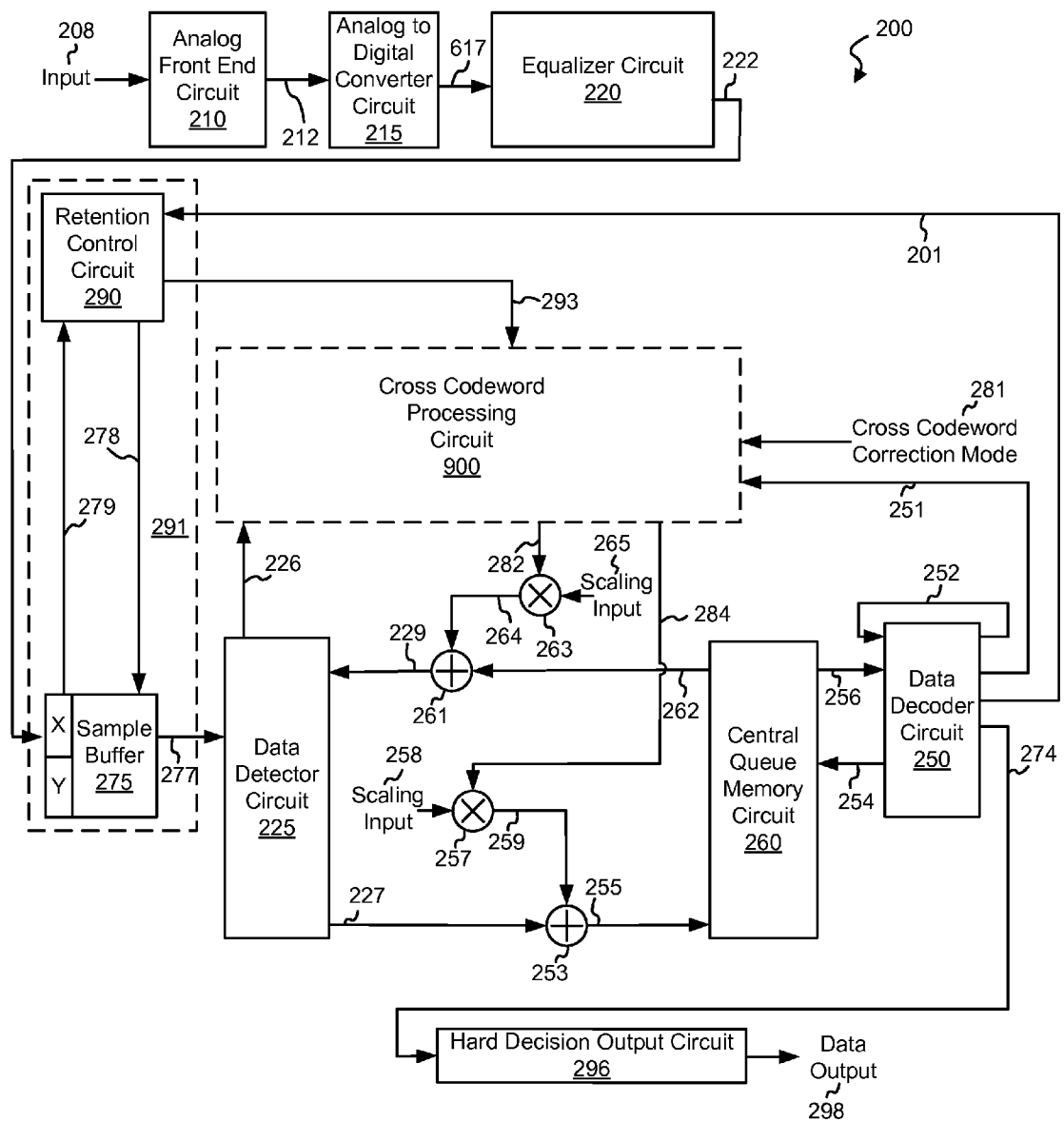

Turning to FIGS. 2a-2b, a data processing circuit 200 including an input buffer circuit having a retention control circuit and a sample buffer in accordance with some embodiments of the present inventions. Data processing circuit 200 includes an analog front end circuit 210 that receives an analog signal 208. Analog front end circuit 210 processes analog signal 208 and provides a processed analog signal 212 to an analog to digital converter circuit 215. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. In some cases, analog input signal 208 is derived from a read/write head assembly (not shown) that is disposed in relation to a storage medium (not shown). In other cases, analog input signal 208 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input signal 208 may be derived.

Analog to digital converter circuit 215 converts processed analog signal 212 into a corresponding series of digital samples 217. Analog to digital converter circuit 215 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Digital samples 217 are provided to an equalizer circuit 220 that equalizes the received data and provides an equalized output 222. Equalized output 222 is provided to a sample buffer 275 and subsequently to a data detector circuit 225. Sample buffer 275 is part of an input buffer circuit 291. Sample buffer 275 is partitioned into two portions—a first portion and a second portion. The first portion (noted as Y) may hold a combination of previously unprocessed codewords (e.g., data sets received as equalized output 222 that have not yet been processed by either a data detector circuit 225 or a data decoder circuit 250) and/or codewords that have failed and have been retained (e.g., data sets received as equalized output 222 that have previously been processed by a combination of data detector circuit 225 and data decoder circuit 250, but failed to converge within a defined number of iterations). The second portion (noted as X) may only hold codewords that have failed and have been retained. Failed codewords are retained in sample buffer 275 under the control of a retention control circuit 290 that is also included as part of input buffer circuit 291. Codewords (whether unprocessed or previously failed) are repeatedly processed through a combination of data detector circuit 225 and data decoder circuit 250 for a number of iterations. The iterations are divided into "global iterations" and "local iterations". As used herein the phrase "global iteration" is a pass through both data detector circuit 225 and data decoder circuit 250, and the phrase "local iteration" is a pass through data decoding circuit 650 during a given global iteration. In some cases, a number of local iterations may be completed for each global iteration. Sample buffer 275 provides stored codewords (whether unprocessed or previously failed) as buffered data 277.

Data detector circuit 225 is a data detector circuit capable of producing an unmodified detected output 227 by applying a data detection algorithm to a data input. As some examples, the data detection algorithm may be, but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 225 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention. Unmodified detected output 227 is the detector extrinsic LLR value, and signal 226 is the sum of detector extrinsic and decoder extrinsic LLR value.

Unmodified detected output 227 is provided to an adder circuit 253 that adds unmodified detected output 227 to a scaled cross codeword soft data adjustment value 259 to yield soft data input 255. Scaled cross codeword decoding soft data adjustment value 259 is provided by a multiplier circuit 257 that multiplies cross codeword decoding soft data adjustment value 284 by a scaling input 258. During standard processing, cross codeword decoding soft data adjustment value 284 is set equal to zero in which soft data input 255 is simply equal to unmodified detected output 227. In contrast, during extended cross codewords error correction decoding (indicated by assertion of a cross codewords correction mode selection 281), cross codeword decoding soft data adjustment value 284 is set to an adjustment value calculated by cross codeword processing circuit 900 based upon decoded output 251 and detected output 226. Specifics of the calculations applied by cross codeword processing circuit 900 are discussed below.

Data decoder circuit 250 applies a data decoding algorithm to decoder input 256 in an attempt to recover originally written data. The result of the data decoding algorithm is provided as a decoded output 254. Similar to detected output 227, decoded output 254 may include both hard decisions and soft decisions. For example, data decoder circuit 250 may be any data decoder circuit known in the art that is capable of applying a decoding algorithm to a received input. Data decoder circuit 250 may be, but is not limited to, a low density parity check decoder circuit or a turbo code decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 250 provides the result of the data decoding algorithm as a data output 274. Data output 274 is provided to a hard decision output circuit 296 where the data is reordered before providing a series of ordered data sets as a data output 298. At this juncture, cross codeword processing circuit 900 updates a converged codeword sign value in accordance with the following equation:

$$\text{Converged Codeword Sign Value} = \Sigma \text{hard decision} \{ LLR_{CCECC,in} [\text{All Converged Codewords}] \},$$

where the hard decision{ } function takes the hard decision for the corresponding soft data for a particular position.

One or more iterations through the combination of data detector circuit 225 and data decoder circuit 250 may be made in an effort to converge on the originally written data set. As mentioned above, processing through both the data detector circuit and the data decoder circuit is referred to as a "global iteration". For the first global iteration, data detector circuit 225 applies the data detection algorithm without guidance from a decoded output. For subsequent global iterations, data detector circuit 225 applies the data detection algorithm to buffered data 277 as guided by decoded output 254. A derivative of decoded output 254 is received from central queue memory 260 as an unmodified detector input 262. Unmodified detector input 262 is added to a scaled cross codeword decoding soft data adjustment value 264 to yield a detector input 229. Scaled cross codeword decoding soft data adjustment value 264 is provided by a multiplier circuit 263 that multiplies cross codeword decoding soft data adjustment value 282 by a scaling input 265. During standard processing, cross codeword decoding soft data adjustment value 282 is set equal to zero in which case detector input 229 is simply equal to unmodified detector input 262. In contrast, during extended cross codewords error correction decoding (indicated by assertion of a cross codewords correction mode selection 281), cross codeword decoding soft data adjustment value 282 is set to an adjustment value calculated by cross codeword processing circuit 900 based upon decoded output 251 and detected output 226. Specifics of the calculations applied by cross codeword processing circuit 900 are discussed below.

During each global iteration it is possible for data decoder circuit 250 to make one or more local iterations including application of the data decoding algorithm to decoder input 256. For the first local iteration, data decoder circuit 250 applies the data decoder algorithm without guidance from a decoded output 252. For subsequent local iterations, data decoder circuit 250 applies the data decoding algorithm to decoder input 256 as guided by a previous decoded output 252. In some embodiments of the present invention, a default of ten local iterations is allowed for each global iteration.

Where a maximum number of global iterations has been performed on a given codeword and yet the codeword has failed to converge (i.e., errors remain to be corrected) as indicated by an output 201, retention control circuit 290 determines whether the codeword is to be retained for additional processing. This determination is made based upon the fill level of sample buffer 275 as indicated by an output 279. In particular, retention control circuit 290 determines whether the first portion of sample buffer 275 is full. Where it is not full, retention control circuit 290 determines whether the first portion already includes a maximum number of retained failed codewords. Where the first portion is not full and currently holds less than the maximum allowed number (N) of retained failed codewords, retention control circuit 290 causes the currently failed codeword to be retained in the first portion. Otherwise, where either it is determined that the maximum number (N) of failed codewords already stored in the first portion equals the maximum or it is determined that the first portion is full, retention control circuit 290 determines whether the second portion of sample buffer 275 is full. Where it is determined that the second portion is not full, the currently failed codeword to be retained in the second portion. Alternatively, where it is determined that the second portion is full, the currently failed codeword is discarded as indicated by an output 293.

When output 293 indicates that a failed codeword has not been retained and rather is to be discarded and a cross codewords correction mode is selected by asserting cross codeword correction mode selection 281, cross codeword processing circuit 900 updates a non-retained codeword minimum soft data value and a non-retained codeword sign value in accordance with the following equations:

$$\text{Non-Retained Codeword Minimum Soft Data Value} = \min \{ (|LLR_{CCECC,in} [\text{All Non-Retained Failed Codewords}]|) \}; \text{ and}$$

$$\text{Non-Retained Codeword Sign Value} = \Sigma \text{hard decision} \{ LLR_{CCECC,in} [\text{All Non-Retained Failed Codewords}] \}.$$

For retained codewords when cross codewords correction mode is selected by asserting cross codeword correction mode selection 281, cross codeword processing circuit 900 can update a retained codeword minimum soft data value and a retained codeword sign value at any convenient point in the processing by accessing retained data. The retained codeword minimum soft data value and the retained codeword sign value may be generated by cross codeword processing circuit 900 in accordance with the following equations:

Retained Codeword Minimum Soft Data Value=min{
 (|LLR$_{CCECC,in}$[All Retained Failed
 Codewords]|)}; and Retained Codeword Sign Value=Σhard
 decision{LLR$_{CCECC,in}$[All Retained Failed
 Codewords]}.

In addition, cross codeword processing circuit 900 combines the various interim values to yield cross codeword soft data adjustment value 282 and cross codeword soft data adjustment value 284. In particular, the sign of both cross codeword soft data adjustment value 282 and cross codeword soft data adjustment value 284 is calculated in accordance with the following equation:

Sign Soft Data Adjustment Value=Converged Codeword Sign Value+Retained Codeword Sign Value+Non-Retained Codeword Sign Value.

The value of both cross codeword soft data adjustment value 282 and cross codeword soft data adjustment value 284 is calculated in accordance with the following equation:

Minimum Soft Data Adjustment Value=Retained Codeword Minimum Soft Data Value+Non-Retained Codeword Minimum Soft Data Value.

Again, cross codeword soft data adjustment value 282 is added to the soft data from data decoder circuit 250, and the resulting updated detector guide (as used herein, the detector guide is derived from the detector prior LLR) provided as detector input 229 is calculated in accordance with the following equation:

Updated Detector Guide=Soft Data Adjustment
 Value*Scaling Factor+LLR$_{Dec,ext}$.

where LLR$_{Dec,ext}$ is the extrinsic soft data resulting from application of the data decoder algorithm. In the preceding applications of the data detector algorithm where cross codeword soft data adjustment value 282 was set to zero, the resulting detector guide provided as detector input 229 is calculated in accordance with the following equation:

Detector Guide=LLR$_{Dec,ext}$.

Thus, during application of the data detector algorithm, soft data generated based upon the cross codewords error correction codeword is used to reprocess the failed codewords. In some embodiments, an additional scaling factor (not shown) may be used to scale the LLR$_{Dec,ext}$. In such a case the updated detector guide is calculated in accordance with the following equation:

Updated Detector Guide=Soft Data Adjustment
 Value*First Scaling Factor+LLR$_{Dec,ext}$*Second
 Scaling Factor.

In such a case, the first scaling factor and the second scaling factor may be user programmable or fixed value or from a look up table memory (not shown).

Cross codeword soft data adjustment value 284 is added to the soft data from data detector circuit 225, and the resulting updated decoder guide (as used herein, the decoder guide is derived from the decoder prior LLR) provided as decoder input 256 is calculated in accordance with the following equation:

Updated Decoder Guide=Soft Data Adjustment
 Value*Scaling Factor+LLR$_{Det,ext}$.

where LLR$_{Det,ext}$ is the extrinsic soft data resulting from application of the data detector algorithm. In the preceding applications of the data decoder algorithm where cross codeword soft data adjustment value 684 was set to zero, the decoder guide was:

Decoder Guide=LLR$_{Det,ext}$.

Thus, during application of the data decoder algorithm, soft data generated based upon the cross codewords error correction codeword is used to reprocess the failed data sectors. In some embodiments, an additional scaling factor (not shown) may be used to scale the LLR$_{Dec,ext}$. In such a case the updated detector guide is calculated in accordance with the following equation:

Updated Detector Guide=Soft Data Adjustment
 Value*First Scaling Factor+LLR$_{Dec,ext}$*Second
 Scaling Factor.

In such a case, the first scaling factor and the second scaling factor may be user programmable or fixed value or from a look up table memory (not shown).

As described in the preceding paragraphs, the updated detector guide and decoder guide are applied to yield both a modified detector input and a modified decoder input. In various embodiments, the updated detector guide and decoder guide are applied more selectively. For example during odd number global iterations only the detector guide is updated based upon the soft data adjustment value, and during even number global iterations only the decoder guide is updated based upon the soft data adjustment value. Thus, the soft data adjustment value may be selectively applied to yield an updated detector guide and an updated decoder guide, applied only to yield an updated detector guide and the decoder guide is not modified to reflect the soft data adjustment value, and applied only to yield an updated decoder guide and the detector guide is not modified to reflect the soft data adjustment value. Thus, the soft data adjustment value can be applied to just the detector input, to just the decoder input, or to a combination of both the detector input and the decoder input.

Turning to FIG. 2b, one implementation of cross codeword processing circuit 900 is shown in accordance with one or more embodiments of the present invention. Where cross codeword processing circuit 900 is used in place of the corresponding block of FIG. 2a, an input 905 is connected to decoded output 251 from which the LLR$_{CCECC,in}$ is derived, an input 985 is connected to cross codeword correction mode selection 281, an output 972 is connected to soft data adjustment value 282, an output 974 is connected to soft data adjustment value 284, an input 995 is connected to output 293, and an input 975 is connected to signal 226 that provides retained codewords to cross codeword processing circuit 900. As shown, cross codeword processing circuit 900 includes a comparator circuit 930 that compares each instance of LLR$_{CCECC,in}$ provided on input 905 with the current minimum soft data value 915 from a minimum non-retained soft data value or converged data value buffer 910. Where comparator circuit 930 indicates that LLR$_{CCECC,in}$ provided on input 905 is less than the current minimum soft data value 915, a selector input 935 is asserted such that LLR$_{CCECC,in}$ is provided to minimum non-retained soft data value or converged data value buffer 910 as a soft data value 925 where it is stored if input 995 is asserted indicating that input 905 is from a codeword that will not be retained or the codeword has converged. As such, current minimum soft data value 915 corresponds to the following equation:

Non-Retained Codeword Minimum Soft Data
 Value=min{(|LLR$_{CCECC,in}$[All Non-Retained
 Failed Codewords]|)}

In addition, input 905 is provided to a sign value circuit 940 that determines the sign thereof and provides it as a sign output 945. Sign output 945 is provided to a sign value summation circuit 950 where it is used to update a soft data sign value 955 when input 995 is asserted indicating that input 905 is from a codeword that will not be retained or the codeword has converged. As such, soft data sign value 955 corresponds to the following equation:

Non-Retained and Converged Codeword Sign Value=$\Sigma$hard decision{$LLR_{CCECC,in}$[All Non-Retained Failed Codewords]}+$\Sigma$hard decision{$LLR_{CCECC,in}$[All Converged Codewords]}.

A cross codeword error approximation circuit calculates the sign and value of output 972 and output 974 in accordance with the following equations:

Sign Soft Data Adjustment Value=Non-Retained and Converged Codeword Sign Value+Retained Codeword Sign Value; and Minimum Soft Data Adjustment Value=Retained Codeword Minimum Soft Data Value+Non-Retained Codeword Minimum Soft Data Value.

Figure 3A:
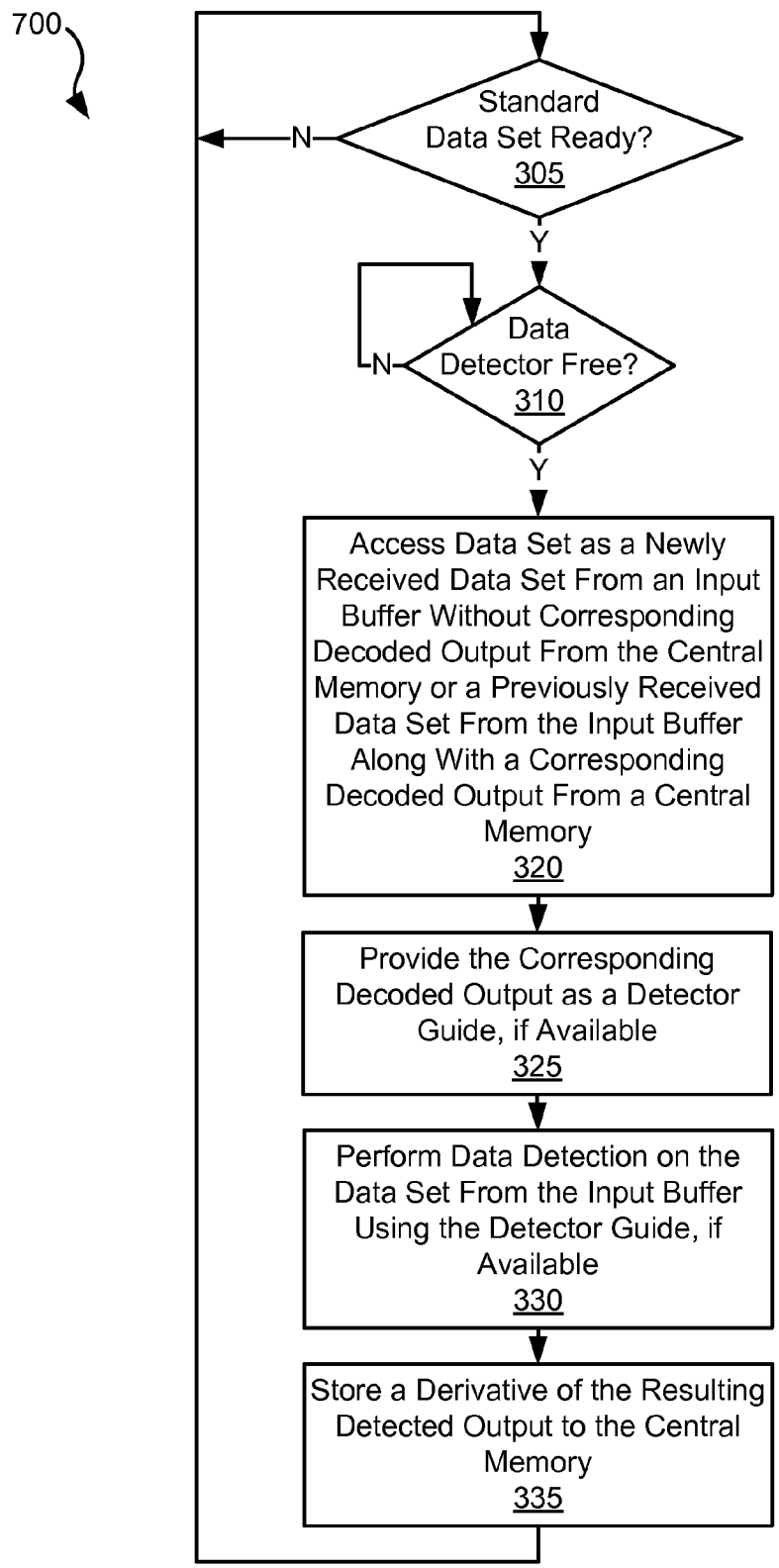
FIGS. 3a-3c depict a method for data processing including selective failed sector retention in accordance with various embodiments of the present invention.
Figure 3B:
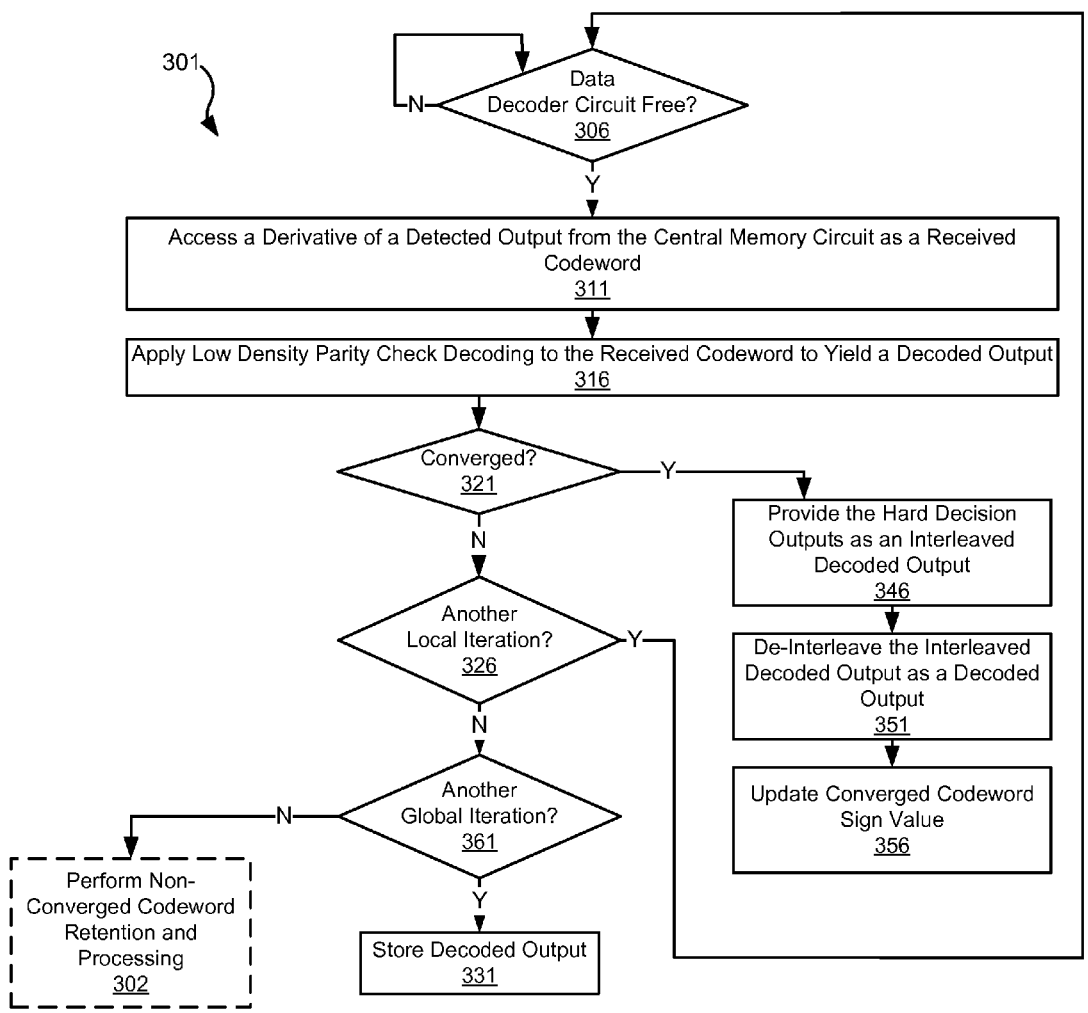
Figure 3C:
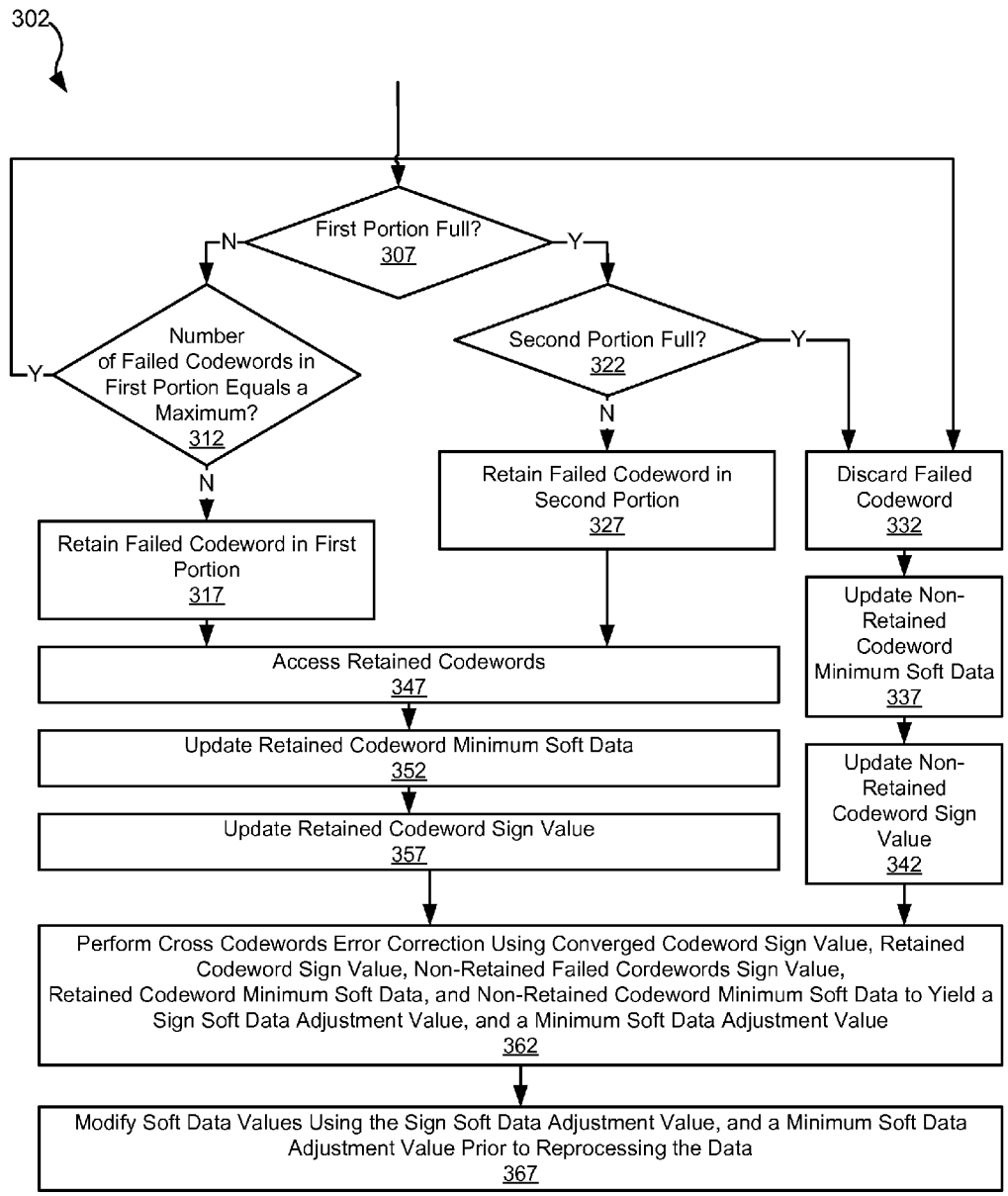

Turning to FIGS. 3a-3c, flow diagrams 300, 301, 302 depict a method for data processing including selective failed sector retention in accordance with various embodiments of the present invention. Following flow diagram 300, where a data set is ready (block 305), it is determined whether a data detector circuit is available to process the data set (block 310). In some cases, a data set is determined to be ready when it is received from a data decoder circuit via a central memory circuit. In other cases, a data set is ready for processing when it is first made available from an front end processing circuit.

Where the data detector circuit is available for processing (block 310), the data set is accessed by the available data detector circuit (block 320). The data detector circuit may be, for example, a Viterbi algorithm data detector circuit or a maximum a posteriori data detector circuit. Where the data set is a newly received data set (i.e., a first global iteration whether it be a previously unprocessed codeword or a previously failed codeword that was retained), the newly received data set is accessed. In contrast, where the data set is a previously received data set (i.e., for the second or later global iterations), both the previously received data set and the corresponding decode data available from a preceding global iteration (available from a central memory) is accessed. Where available (i.e., on a second or later global iteration), the corresponding decoded output is provided as a detector guide (block 325). The accessed data set is then processed by application of a data detection algorithm to the data set guided, where available, by the detector guide (block 330). Where the data set is a newly received data set (i.e., a first global iteration), it is processed without guidance from decode data available from a data decoder circuit. Alternatively, where the data set is a previously received data set (i.e., for the second or later global iterations), it is processed with guidance of corresponding decode data available from preceding global iterations. Application of the data detection algorithm yields a detected output, and a derivative of the detected output is stored to the central memory (block 335). The derivative of the detected output may be, for example, an interleaved or shuffled version of the detected output.

Following flow diagram 301 of FIG. 3b, in parallel to the previously described data detection process, it is determined whether a data decoder circuit is available (block 306). The data decoder circuit may be, for example, a low density data decoder circuit applying a belief-propagation data decode algorithm as are known in the art. In various cases, the data decoder circuit may be a low density parity check decoder circuit. Where the data decoder circuit is available (block 306), a previously stored derivative of a detected output is accessed from the central memory and used as a received codeword (block 311). A low density data decoding algorithm is applied to the received codeword to yield a decoded output (block 316).

It is determined whether the decoded output converged (i.e., all parity checks were resolved) (block 321). Where the decoded output converged (block 321), the hard decisions from the decoded output are provided as an interleaved decoded output (block 346). The interleaved decoded output includes data that is shuffled (i.e., interleaved). The interleaved decoded output is de-interleaved to remove the shuffling and thereby yield a decoded output (block 351). A converged codeword sign value is updated based upon the aforementioned decoded output (block 356). The converged codeword sign value is calculated in accordance with the following equation:

Converged Codeword Sign Value=$\Sigma$hard decision{$LLR_{CCECC,in}$[All Converged Codewords]}.

This information may then be used in relation to later cross codewords error correction.

Alternatively, where the decoded output failed to converge (block 321), it is determined if another local iteration is desired (block 326). Where another local iteration is desired (block 326), the next iteration through the data decoder circuit is applied. When another local iteration is not allowed (block 326), it is determined whether another global iteration is desired (block 361). Where another global iteration is desired (block 361), the decoded output is stored to the central memory to await re-application of the data detection algorithm discussed above in relation to FIG. 3a (block 331).

In contrast, where another global iteration is not allowed (block 336), non-converged codeword retention and processing is performed in accordance with flow diagram 302, for this reason, block 302 is shown in dashed lines. Following to flow diagram 302 of FIG. 3c, it is determined whether a first portion of a sample buffer is full (block 307). In some embodiments of the present invention, a sample buffer that feeds data to a data detector circuit is divided into at least two portions (i.e., at least a first portion and a second portion) that are treated distinctly. Where it is determined that the first portion is not full (i.e., has sufficient room for at least one codeword) (block 307), it is determined whether the maximum number (N) of failed codewords already stored in the first portion equals a maximum (block 312). Where it is determined that the maximum number (N) of failed codewords already stored in the first portion does not equal a maximum (block 312), the failed codeword is retained in the first portion of the sample buffer (block 317).

Otherwise, where either it is determined that the maximum number (N) of failed codewords already stored in the first portion equals the maximum (block 312) or it is determined whether a first portion of a sample buffer is full (block 307), it is determined whether the second portion is full (block 327). The retained codewords are accessed from the sample buffer (block 347). The retained codeword minimum soft data value is updated (block 352). This retained codeword minimum soft data value may be performed in accordance with the following equation:

Retained Codeword Minimum Soft Data Value=min{(|LLR$_{CCECC,in}$[All Retained Failed Codewords]|)}.

In addition, a retained codeword sign value is updated for the discarded codeword (block 357) This retained codeword sign value may be performed in accordance with the following equation:

Retained Codeword Sign Value=Σhard decision{LLR$_{CCECC,in}$[All Retained Failed Codewords]}.

Where it is determined that the second portion is not full (i.e., has sufficient room for at least one codeword)(block 322), the failed codeword is retained in the second portion of the sample buffer (block 327). Alternatively, where it is determined that the second portion is full (block 322), the failed codeword is discarded (block 332). A non-retained codeword minimum soft data value is updated for the discarded codeword (block 337). This non-retained codeword minimum soft data value may be performed in accordance with the following equation:

Non-Retained Codeword Minimum Soft DataValue=min{(|LLR$_{CCECC,in}$[All Non-Retained Failed Codewords]|)}.

In addition, a non-retained codeword sign value is updated for the discarded codeword (block 342). This non-retained codeword sign value may be performed in accordance with the following equation:

Non-Retained Codeword Sign Value=Σhard decision{LLR$_{CCECC,in}$[All Non-Retained Failed Codewords]}.

Cross codewords error correction is performed using the converged codeword sign value, the retained codeword sign value, the non-retained codeword sign value, the retained codeword minimum soft value, and the non-retained codeword minimum soft value (block 362). In some cases, the cross codewords error correction includes calculating soft data adjustment values in accordance with the following equations:

Sign Soft Data Adjustment Value=Converged Codeword Sign Value+Retained Codeword Sign Value+Non-Retained Codeword Sign Value; and Minimum Soft Data Adjustment Value=Retained Codeword Minimum Soft Data Value+Non-Retained Codeword Minimum Soft Data Value.

The minimum soft data adjustment value with the sign of the sign soft data adjustment value is provided as a soft data adjustment value. The aforementioned minimum soft data adjustment value is used to modify soft data values (block 367).

In some cases, re-application of the data detector algorithm to a failed codeword sector is guided by the following updated detector guide:

Updated Detector Guide=Soft Data Adjustment Value*Scaling Factor+LLR$_{Dec,ext}$.

where LLR$_{Dec,ext}$ is the extrinsic soft data resulting from application of the data decoder algorithm. In the preceding applications of the data detector algorithm where cross codeword soft data adjustment value was set to zero, the resulting detector guide provided as the detector input is calculated in accordance with the following equation:

Detector Guide=LLR$_{Dec,ext}$.

Thus, during application of the data detector algorithm, soft data generated based upon the cross codewords error correction codeword is used to reprocess the failed codewords.

The soft data adjustment value is added to the soft data from the data detector circuit applying the data detection algorithm, and the resulting updated decoder guide is calculated in accordance with the following equation:

Updated Decoder Guide=Soft Data Adjustment Value*Scaling Factor+LLR$_{Det,ext}$.

where LLR$_{Det,ext}$ is the extrinsic soft data resulting from application of the data detector algorithm. In the preceding applications of the data decoder algorithm where cross codeword soft data adjustment value was set to zero, the decoder guide was:

Decoder Guide=LLR$_{Det,ext}$.

Thus, during application of the data decoder algorithm, soft data generated based upon the cross codewords error correction codeword is used to reprocess the failed data sectors.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
    a processing circuit that processes unprocessed codewords, and provides failed codewords when the processing fails to converge; and
    an input buffer circuit that selectively stores a combination of at least one of the unprocessed codewords and at least one of the failed codewords, wherein the input buffer circuit includes a sample buffer including:
        a first portion that maintains any of the unprocessed codewords and the failed codewords; and
        a second portion that maintains only the failed codewords.

2. The data processing system of claim 1, wherein the processing circuit comprises:
    a data detector circuit that applies a data detection algorithm to one of the unprocessed codewords from the first portion to yield a detected output; and a data decoder circuit that applies a data decoding algorithm to a decoder input derived from the detected output to yield a decoded output.

3. The data processing system of claim 2, wherein the detected output is a first detected output and the decoded output is a first decoded output, wherein the data detector circuit applies the data detection algorithm to one of the maintained codewords from the first portion to yield a second detected output, and wherein the data decoder circuit applies the data decoding algorithm to a decoder input derived from the second detected output to yield a second decoded output.

4. The data processing system of claim 2, wherein the detected output is a first detected output and the decoded output is a first decoded output, wherein the data detector circuit applies the data detection algorithm to one of the maintained codewords from the second portion to yield a second detected output, and wherein the data decoder circuit applies the data decoding algorithm to a decoder input derived from the second detected output to yield a second decoded output.

5. The data processing system of claim 2, wherein the data decoding algorithm is a low density parity check decoding algorithm, and the data detection algorithm is a maximum a posteriori data detection algorithm.

6. A data processing system, the system comprising:
a processing circuit that processes unprocessed codewords, and provides failed codewords when the processing fails to converge; and
an input buffer circuit that selectively stores a combination of at least one of the unprocessed codewords and at least one of the failed codewords, wherein the input buffer circuit includes:
a first portion that maintains any of the unprocessed codewords and the failed codewords; and
a second portion that maintains only the failed codewords, wherein the input buffer circuit includes a sample buffer and a retention control circuit, wherein the retention control circuit determines whether respective ones of the maintained codewords are to be stored in the sample buffer.

7. The data processing system of claim 6, wherein the retention control circuit causes a respective one of the failed codewords to be stored to the first portion when a maximum number of failed codewords is not already stored in the first portion.

8. The data processing system of claim 7, wherein the retention control circuit causes a respective one of the failed codewords to be stored to the second portion when either the maximum number of failed codewords is already stored in the first portion or the first portion is full.

9. The data processing system of claim 8, wherein M is the size of the second portion, and wherein N is the maximum number of failed codewords for the first portion, and wherein M is greater than N.

10. The data processing system of claim 8, wherein M is the size of the second portion, and wherein N is the maximum number of failed codewords for the first portion, and wherein M is less than or equal to N.

11. The data processing system of claim 8, wherein M is the size of the second portion, and wherein N is the maximum number of failed codewords for the first portion, and wherein at least one of M or N is user programmable.

12. The data processing system of claim 1, wherein the data processing system is implemented as part of a storage device including a storage medium.

13. The data processing system of claim 1, wherein the data processing system is implemented as part of an integrated circuit.

14. A data processing system, the system comprising:
a data processing circuit that receives a data set including a plurality of data codewords and a cross codewords error correction codeword including encoding generated from the plurality of data codewords, wherein failed processing of one of the plurality of data codewords yields a first failed codeword and failed processing of another of the plurality of data codewords yields a second failed codeword, and wherein the data processing circuit includes:
a scheduling circuit that retains the first failed codeword as a retained codeword and discards the second failed codeword as a non-retained codeword;
a cross codeword processing circuit that calculates a soft data adjustment value based at least in part on both the retained codeword and the non-retained codeword; and
a data decoding circuit that applies a data decoding algorithm to at least one of the plurality of data codewords guided by a decoder input generated in part from the soft data adjustment value.

15. The data processing system of claim 14, wherein the soft data adjustment value is a first soft data adjustment value, and wherein the data processing circuit further comprises:
a data detector circuit that applies a data detection algorithm to at least one of the plurality of data codewords guided by a detector input generated in part from a second soft data adjustment value.

16. The data processing system of claim 15, wherein the data detector circuit provides a detector output, and wherein the decoder input is generated in part by adding the first soft data adjustment value to the detector output.

17. The data processing system of claim 16, wherein the decoder input is generated by multiplying the result of adding the first soft data adjustment value to the detector output by a scaling value.

18. The data processing system of claim 15, wherein the data decoding circuit provides a decoder output, and wherein the detector input is generated in part by adding the second soft data adjustment value to the decoder output.

19. The data processing system of claim 18, wherein the detector input is generated by multiplying the result of adding the second soft data adjustment value to the decoder output by a scaling value.

20. A method for processing data, the method comprising:
accessing an unprocessed codeword from a first portion of a sample buffer;
applying a processing algorithm to the unprocessed codeword to yield a failed codeword where the processing algorithm failed to converge;
using a retention control circuit to determine a location to retain the failed codeword, wherein:
where the first portion of the sample buffer is full or a maximum number of failed codewords is already stored in the first portion, the retention control circuit causes the failed codeword to be stored in a second portion of the sample buffer; and
where the first portion of the sample buffer is not full and a maximum number of failed codewords is not already stored in the first portion, the retention control circuit causes the failed codeword to be stored in the first portion of the sample buffer.

21. The method of claim 20, wherein M is the size of the second portion of the sample buffer, and wherein N is the maximum number of failed codewords for the first portion of the sample buffer, and wherein M is greater than N.

22. The method of claim 20, wherein M is the size of the second portion of the sample buffer, and wherein N is the maximum number of failed codewords for the first portion of the sample buffer, and wherein M is less than or equal to N.

23. The method of claim 20, wherein M is the size of the second portion of the sample buffer, and wherein N is the maximum number of failed codewords for the first portion of the sample buffer, and wherein at least one of M or N is user programmable.

* * * * *